(12) United States Patent
Thomas et al.

(10) Patent No.: US 9,054,535 B2
(45) Date of Patent: *Jun. 9, 2015

(54) METHODS AND SYSTEMS FOR CHARGING AN ENERGY STORAGE DEVICE

(75) Inventors: Cecilia Maria Thomas, Shepherdsville, KY (US); John Kenneth Hooker, Louisville, KY (US); Scott Jeffrey Hall, Louisville, KY (US); Shawn Alan Morgan, Goshen, KY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,843

(22) Filed: Aug. 20, 2012

(65) Prior Publication Data

US 2013/0038286 A1 Feb. 14, 2013

Related U.S. Application Data

(63) Continuation of application No. 13/205,210, filed on Aug. 8, 2011, now Pat. No. 8,384,347.

(51) Int. Cl.
*H02J 7/00* (2006.01)
(52) U.S. Cl.
CPC .................................... *H02J 7/0004* (2013.01)
(58) Field of Classification Search
USPC .......................... 320/106, 109, 111, 113, 115
See application file for complete search history.

(56) References Cited

U.S. PATENT DOCUMENTS

| | | | | |
|---|---|---|---|---|
| 5,504,416 A * | 4/1996 | Holloway et al. | ............. | 320/152 |
| 5,963,018 A | 10/1999 | Guthrie | | |
| 6,339,311 B1 * | 1/2002 | Caldwell | ........................ | 320/101 |
| 6,721,400 B2 | 4/2004 | Schelberg, Jr. et al. | | |
| 2002/0167223 A1 * | 11/2002 | Yamazaki | ...................... | 307/9.1 |
| 2003/0085686 A1 | 5/2003 | Haga et al. | | |
| 2009/0085686 A1 * | 4/2009 | Schon et al. | ................... | 332/103 |
| 2009/0174365 A1 | 7/2009 | Lowenthal et al. | | |
| 2010/0161517 A1 * | 6/2010 | Littrell | .......................... | 705/412 |
| 2010/0176750 A1 * | 7/2010 | West | .............................. | 315/362 |
| 2010/0231174 A1 * | 9/2010 | Li et al. | ......................... | 320/145 |
| 2011/0004358 A1 | 1/2011 | Pollack et al. | | |
| 2011/0072112 A1 | 3/2011 | Kaplan | | |

FOREIGN PATENT DOCUMENTS

| | | |
|---|---|---|
| WO | 2011009129 A1 | 1/2011 |
| WO | 2011014757 A2 | 2/2011 |

OTHER PUBLICATIONS

Pellegrino, et al., An Integral Battery Charger With Power Factor Correction for Electric Scooter, IEEE Power Electronics Society, Mar. 2010, pp. 751-759, vol. 25, Issue 3.

\* cited by examiner

*Primary Examiner* — Samuel Berhanu
(74) *Attorney, Agent, or Firm* — General Electric Company

(57) ABSTRACT

A charging device for charging an energy storage device is described. The charging device includes a memory for storing a plurality of state machines and a processing device coupled to the memory. The processing device is configured to select a state machine of the plurality of state machines and to operate the charging device in accordance with the selected state machine.

19 Claims, 7 Drawing Sheets

METHODS AND SYSTEMS FOR CHARGING AN ENERGY STORAGE DEVICE

CROSS-REFERENCE TO RELATED APPLICATIONS

This application is a continuation of U.S. patent application Ser. No. 13/205,210 filed Aug. 8, 2011 now U.S. Pat. No. 8,384,347 which is hereby incorporated by and is assigned to the assignee of the present invention.

BACKGROUND OF THE INVENTION

The embodiments described herein relate generally to electric vehicles and, more specifically, to methods and systems for charging a vehicle that includes an electrochemical energy storage device.

In response to both increasing fuel costs related to the use of conventional combustion engine vehicles and heightened environmental concerns, including air pollution, the use of electric and hybrid vehicles has increased. As a result, energy demand will likely increase in the form of electrical energy used to charge batteries or other energy storage devices used in such vehicles. Electric vehicles, or vehicles that include an electrochemical energy storage device, are defined herein as vehicles that derive some portion of the power used to propel the vehicle from an energy storage device, for example, from batteries. Electric vehicles may include, but are not limited to, vehicles that rely solely on energy stored in batteries to drive an electric motor that propels the vehicle (e.g., a traction motor), vehicles that include batteries for storing energy used to drive a traction motor and also include an internal combustion engine that drives a generator used to recharge the batteries, and vehicles that include a combination of electric and fossil fuel powered components (e.g., hybrid vehicles).

Currently, charging devices, also referred to as charging stations or electric vehicle supply equipment (EVSE), provide power to an electric vehicle for charging of the energy storage devices within the electric vehicle. However, safety requirements and charging protocols are not consistent throughout the world. The various requirements and protocols may necessitate that a different model of charging station controller be designed and manufactured for use in different parts of the world.

BRIEF DESCRIPTION OF THE INVENTION

In one aspect, a charging device for charging an energy storage device is provided. The charging device includes a memory for storing a plurality of state machines and a processing device coupled to the memory. The processing device is configured to select a state machine of the plurality of state machines and to operate the charging device in accordance with the selected state machine.

In another aspect, a method for controlling a charging device for charging of an energy storage device is provided. The method includes storing a plurality of state machines and configuring a charging device controller to select a state machine of the plurality of state machines and to operate the charging device in accordance with the selected state machine.

In yet another aspect, a system for charging an energy storage device is provided. The system includes a memory for storing a plurality of state machines and a processing device coupled to the memory. The processing device is configured to select a state machine of the plurality of state machines and to operate the system in accordance with the selected state machine.

DETAILED DESCRIPTION OF THE INVENTION

The methods and systems described herein facilitate charging an energy storage device. More specifically, the methods and systems described herein facilitate charging of a vehicle that includes an electrochemical energy storage device. Furthermore, the methods and systems described herein facilitate use of a single electric vehicle charging device controller in various models of electric vehicle charging devices, also referred to herein as electric vehicle charging stations. Such models may be required to adhere to standards and/or protocols specific to a country and/or region where the charging station is to be operated. The charging station controller is configured to operate in accordance with a plurality of state machines, wherein each state machine corresponds to a different model of electric vehicle charging station.

Technical effects of the methods and systems described herein include at least one of: (a) storing a plurality of state machines; (b) initializing an electric vehicle charging station; (c) determining a selected state machine of the plurality of state machines; and (d) operating the electric vehicle charging station in accordance with the selected state machine.

Figure 1:
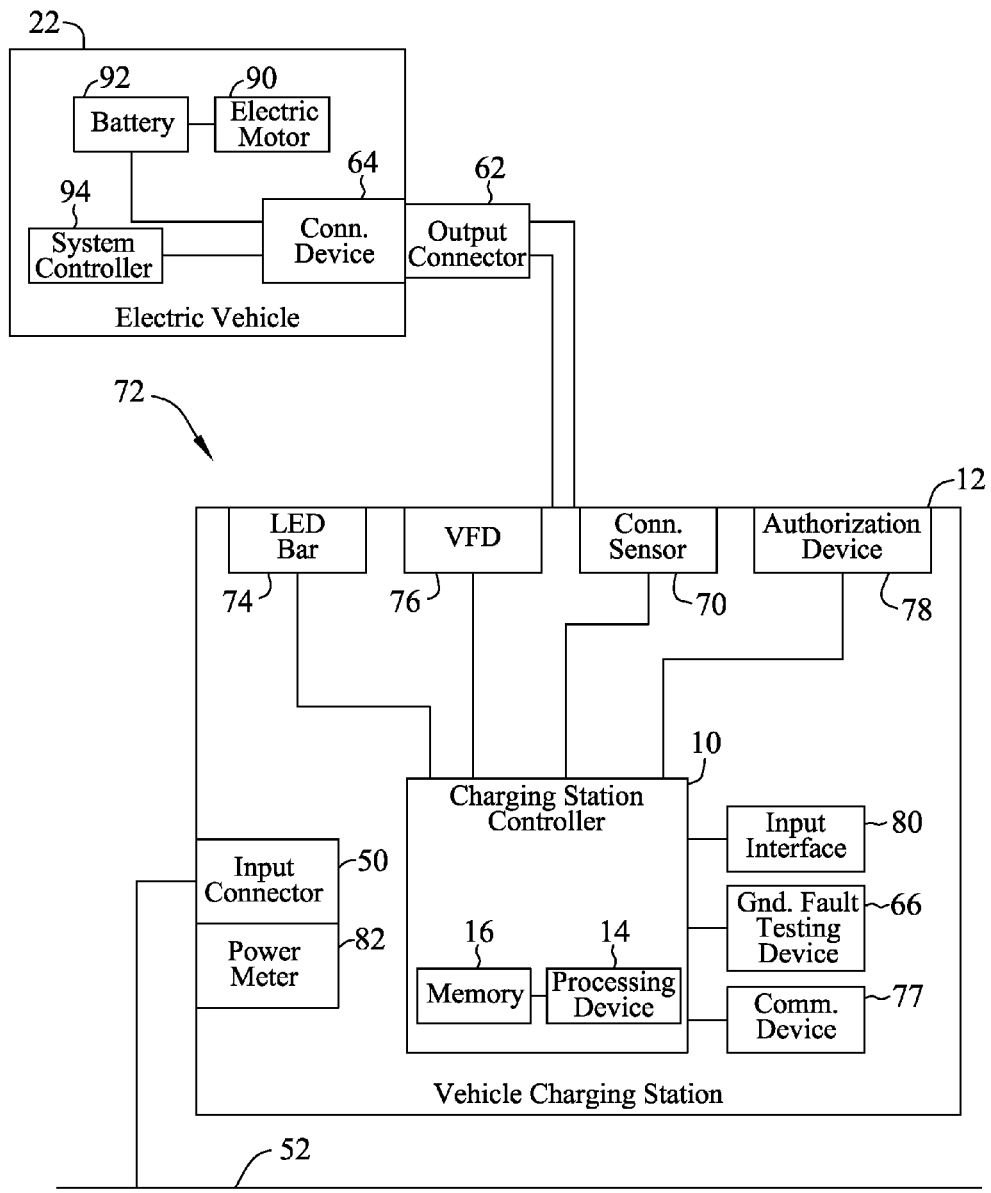
FIG. 1 is a block diagram of an exemplary charging station controller included within an exemplary electric vehicle charging station.

FIG. 1 is a block diagram of an exemplary charging station controller 10 included within an exemplary electric vehicle charging station 12. In the exemplary embodiment, charging station controller 10 is a microcontroller that includes a processing device 14 and a memory 16. The term controller, as used herein, may refer to central processing units, microprocessors, microcontrollers, reduced instruction set circuits (RISC), application specific integrated circuits (ASIC), logic circuits, and any other circuit or processor capable of executing the functions described herein.

In the exemplary embodiment, charging station 12 is configured for operation at a first location. For example, charging station 12 is configured to operate in accordance with standards promulgated for charging station operation at the first location. More specifically, various standards and/or regulations regarding charging of an electric vehicle are implemented in different countries and/or in different regions of the world. For example, a charging station operated in the United States of America must satisfy different regulatory standards than a charging station operated in Germany. Current standards for charging stations operated in the United States of America may be referred to as National Electrical Manufacturers Association (NEMA) compliant standards. For example, a NEMA compliant charging station is compliant with Society of Automotive Engineers (SAE) standards, including, but not limited to SAE standard J1772 for vehicle charging functionality, and Underwriters Laboratories (UL) standards, including but not limited to, UL standard 2231 for protection functionality. Current standards for charging stations operated in Europe are published by the International Electrotechnical Commission (IEC), for example, in IEC standard 61851. In the exemplary embodiment, charging station 12 is configured for NEMA compliant charging of an electric vehicle 22.

In the exemplary embodiment, electric vehicle charging station 12 includes at least one input connector 50 for coupling with an AC power source 52. For example, AC power source 52 may include, but is not limited to, an AC grid. Input connector 50 may include a plurality of terminals configured to place charging station 12 in electrical communication with AC power source 52, components that facilitate inductive coupling of charging station 12 and AC power source 52, and/or any other type of connector that places charging station 12 in electromagnetic communication with AC power source 52. AC grids are maintained at different voltage levels dependent upon a location within the distribution/transmission process. In the exemplary embodiment, AC power source 52 provides charging station 12 with 240 volt single phase AC power, which is a typical voltage level available on a power grid located in the United States of America. Although described as receiving 240 volt AC power, charging station 12 may receive power having any suitable voltage level that allows the charging station 12 to function as described herein.

In the example embodiment, electric vehicle charging station 12 also includes a plurality of conductors, for example, positioned within an electrical cable 60. In the example embodiment, electrical cable 60 includes an output connector 62 and electric vehicle 22 includes a corresponding input connector, included within, for example, a connection device 64, for coupling charging station 12 to electric vehicle 22. Output connector 62 may include a plurality of terminals configured to place charging station 12 in electrical communication with electric vehicle 22, components that facilitate inductive coupling of charging station 12 and electric vehicle 22, and/or any other type of connector that selectively places charging station 12 in electromagnetic communication with electric vehicle 22.

In the exemplary embodiment, charging station 12 includes a ground fault testing device 66 coupled to controller 10. Ground fault testing device 66 may include, but is not limited to, a ground fault current transformer. If ground fault testing device 66 detects a ground fault condition, controller 10 registers a fault condition.

In the exemplary embodiment, charging station 12 also includes a connector sensor 70. Controller 10 determines if output connector 62 has been returned to charging station 12 based on a signal from connector sensor 70. Output connector 62 is returned to charging station 12 in a similar manner to a nozzle being returned to a gasoline pump.

Charging station 12 also may include at least one display device 72 communicatively coupled to controller 10. For example, display device 72 may be in electrical communication with controller 10, may be configured to wirelessly communicate with controller 10, and/or may be in communication with controller 10 in any other manner that allows charging station 12 to function as described herein. Controller 10 is configured to provide information to an operator of charging station 12 using display device 72 and/or to prompt the operator to provide information to charging station 12. For example, display device 72 may include a light emitting diode (LED) bar 74 and/or a vacuum fluorescent display (VFD) 76. Display device 72 may also include, but is not limited to, a liquid crystal display (LCD) and/or an LED display.

Furthermore, in an alternative embodiment, display device 72 is not included within charging station 12, but rather, is positioned remotely from charging station 12 and communicatively coupled to charging station 12. For example, if charging station 12 is positioned outside, for example, in a parking facility, display device 72 may be included within a kiosk positioned inside a structure. This would allow a user to interact with charging station 12 while protected from the elements. In another example, display device 72 may be included within a consumer device capable of receiving information from charging station 12. Display device 72 may be included within a cellular communications device and/or a personal computer configured to receive, for example, a short message service (SMS) text message or electronic mail message from charging station 12. Furthermore, display device 72 may be included within a consumer device capable of accessing a World Wide Web site that includes information provided by charging station 12. In the alternative embodiment, charging station 12 also includes a communication device 77 that transmits information, for example, to an external server (e.g., a backend server), which either provides the consumer device with access to the information, or transmits the information to the consumer device. Furthermore, communication device 77 may also be configured to receive information from such a kiosk or consumer device, including, but not limited to, an operator's response to a prompt for information from charging station 12.

Charging station 12 may also include at least one authorization device 78. Authorization device 78 may include, but is not limited to, a keypad, a radio frequency identification (RFID) device, a magnetic stripe card reader, and a biometrics reader. Authorization device 78 provides controller 10 with authentication information identifying, for example, an identity of an operator of electric vehicle 22, a make/model of electric vehicle 22, and/or a financial account associated with the operator of electric vehicle 22. In the exemplary embodiment, controller 10 may compare the authentication information to data stored in an internal database to authorize the operator, or may transmit the authentication information to a server positioned external to charging station 12 for off-site authorization of the operator.

In an alternative embodiment, authorization device 78 is not included within charging station 12, but rather, is positioned remotely from, and communicatively coupled to, charging station 12. As described above with respect to display device 72, authorization device 78 may be included within, as examples only, a kiosk or a consumer device capable of receiving information from, and transmitting information to, charging station 12. For example, a cellular communications device and/or a personal computer may be used to provide charging station 12 with authentication information.

In the exemplary embodiment, controller 10 includes a plurality of state machines. For example, the plurality of state machines may be stored in firmware included within controller 10. Controller 10 operates in accordance with a selected one of the state machines. As referred to herein, a state machine is a behavioral model composed of states and transitions between the states that are enabled by fulfillment of at least one predefined condition, for example, a change to an input to the system monitored by the state machine. Entry, waiting to exit, and exit actions are executed for each state. For example, the state machine responds to an input to the system by transitioning out of a first state (i.e., a current state) and entering a second state. The state machine executes exit actions associated with the first state upon exiting the first state and executes entry actions associated with the second state upon entering the second state. After entering the second state, the state machine also executes waiting to exit actions associated with the second state until the inputs change and trigger another state transition.

In the exemplary embodiment, controller 10 may include a state machine configured such that controller 10 operates in accordance with the requirements of the first location, for example, in accordance with NEMA standards. Controller 10 may also include a state machine configured such that controller 10 operates in accordance with requirements of a specific purchaser of charging station 12 and/or in accordance with specifications of a specific model of charging station 12. For example, operating in accordance with a first state machine configures controller 10 to analyze inputs from devices including, but not limited to, ground fault testing device 66 and connector sensor 70, and to operate charging station 12 in accordance with NEMA standards.

More specifically, each of the state machines manages a sequence of events and actions that charging station 12 performs to run a charge cycle. Each state machine includes a list of states that charging station 12 may enter when interfacing with an operator and/or a vehicle. Furthermore, each state machine includes entry actions and exit actions associated with each state as well as waiting actions that are executed while waiting to transition out of the state. In order to meet a first plurality of requirements, charging station 12 performs predefined tests prior to commencing a charging session. There are also tests and notifications that are issued to achieve design and performance goals. The state machine also enables controller 10 to be responsive to a vehicle pilot signal and to provide user feedback via display device 72.

In the exemplary embodiment, after initialization of charging station 12, firmware included within controller 10 determines which state machine of the plurality of state machines to run. In the exemplary embodiment, charging station 12 includes an input interface 80 for receiving a charging station selection signal. For example, controller 10 may determine which state machine to run based on the charging station selection signal received via input interface 80. For example, when installing charging station 12, a technician may select one state machine that controller 10 should run. Input interface 80 may include, but is not limited to including, at least one dual in-line package (DIP) switch, a connector configured to receive one of a plurality of wiring harnesses, a communication device configured to receive a charging station selection signal, and/or or any other suitable type of input device that allows charging station 12 to function as described herein. More specifically, the communication device may include or be coupled to a configuration server that provides settings to a non-volatile memory (e.g., memory 16) for storage in the non-volatile memory. In an alternative embodiment, controller 10 determines which state machine to run based on a detected configuration of charging station 12.

By configuring controller 10 to operate in accordance with a state machine, and by storing a plurality of state machines within controller 10, a single controller may be designed and manufactured for use in a variety of charging station models. Furthermore, an identical controller 10 may be included within charging stations having a variety of different features, and/or a variety of different feature packages. As new charging station model options are offered by a manufacturer, additional state machines may be included within controller 10. As new features are offered for use by a specific model of charging station 12, new or edited states may be added to state machines stored within controller 10.

Furthermore, charging station 12 may include a power meter 82, which also may be referred to as a smart meter. Power meter 82 monitors and controls an output of charging station 12. For example, power meter 82 may limit the power output of charging station 12.

In the exemplary embodiment, electric vehicle 22 includes an electric motor 90 and at least one energy storage device, for example, but not limited to, a battery 92 configured to power electric motor 90. Electric motor 90 is coupled to a traction system (not shown in FIG. 1) of electric vehicle 22 and may also be referred to as a traction motor. Battery 92, as referred to herein, may include a single electrochemical cell, a plurality of electrochemical cells coupled to form a battery array, or any other suitable configuration of chemical energy storage devices.

Electric vehicle 22 also includes a system controller 94 configured to communicate with controller 10. System controller 94 and charging station controller 10 control a pilot signal used for communication between electric vehicle 22 and controller 10. For example, charging station controller 10 may control whether the pilot signal is constant or oscillating and system controller 94 may control a magnitude of the pilot signal to indicate if vehicle 22 is connected, ready to charge, and/or ready to charge with a vent fan. More specifically, when electric vehicle 22 is coupled to charging station 12, system controller 94 may drive the pilot signal down from a constant 12 volts (V) to 9 V. When charging begins, charging station controller 10 may oscillate the signal to indicate to system controller 94 a level of current vehicle 22 may draw (e.g., a duty cycle of the oscillating signal corresponds to the current level). Control of the pilot signal is based on predefined standards, for example, Society of Automotive Engineers (SAE) standard J1772.

Figure 2:
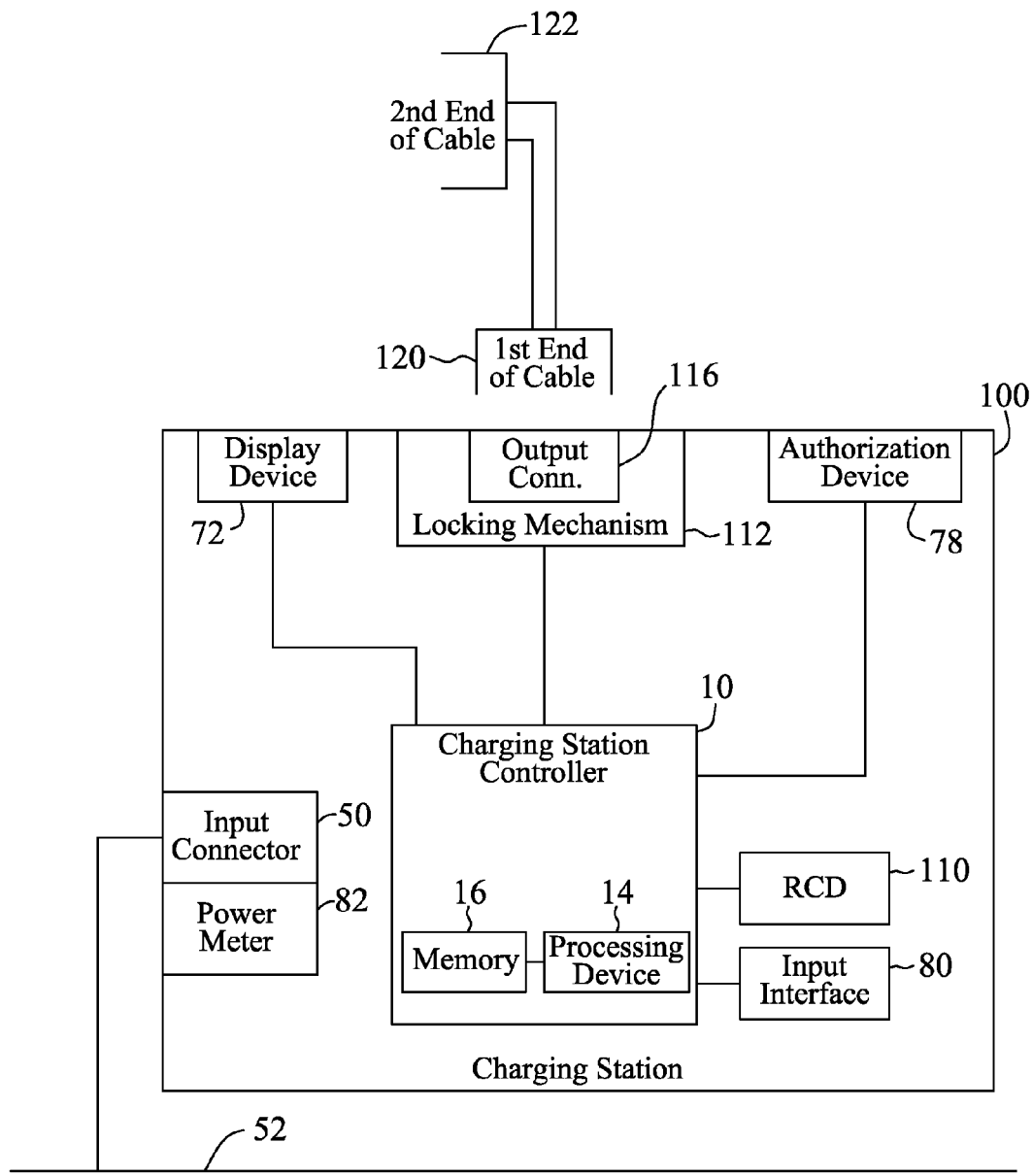
FIG. 2 is a block diagram of the charging station controller shown in FIG. 1, included within, and configured to control operation of, an alternative electric vehicle charging station.

FIG. 2 is a block diagram of charging station controller 10 included within, and configured to control operation of, an alternative electric vehicle charging station 100. The alternative electric vehicle charging station 100 is configured for operation at a second location. For example, charging station 100 is configured to operate in accordance with standards promulgated for charging station operation at the second location. In the alternative embodiment, charging station 100 is configured for IEC compliant charging of an electric vehicle 22. More specifically, charging station controller 10 is configured for operation in the second location.

In the exemplary embodiment, charging station 100 is coupled to, and configured to receive power from, AC power source 52. AC power source 52 may provide charging station 100 with 380 volt 3-phase AC power, which is a typical voltage level available on a power grid located in, for example, European countries. Although described as receiving 380 volt AC power, charging station 100 may receive power having any suitable voltage level that allows the charging station 100 to function as described herein.

One example difference between a NEMA compliant charging station and an IEC compliant charging station is the detection of a ground fault. NEMA specifications include use of a ground fault testing device 66 (shown in FIG. 1), for example, a ground fault current transformer. In contrast, electric vehicle charging station 100 includes a residual current detection device (RCD) 110. Controller 10 identifies a level of residual current based on a signal from RCD 110 and registers a fault if the level is above a predefined level. For example, the predefined level is defined within IEC standards.

Charging station 100 may also include a locking mechanism 112 that locks a cable 114 to charging station 100. An example of locking mechanism 112 is available from Mennekes® Electrical Products of Fairfield, N.J., USA. In contrast to the NEMA compliant charging station 12 (shown in FIG. 1), charging station 100 does not include a cable for selectively coupling charging station 100 to electric vehicle 22. Rather, cable 114 is provided by the operator of electric vehicle 22. Charging station 100 includes an output connector 116 and locking mechanism 112 that couple with a first end 120 of cable 114. A second end 122 of cable 114 is configured for coupling with electric vehicle 22. Output connector 116 may include a plurality of terminals configured to place charging station 100 in electrical communication with electric vehicle 22, components that facilitate inductive coupling of charging station 100 and electric vehicle 22, and/or any other type of connector that selectively places charging station 100 in electromagnetic communication with electric vehicle 22. Since cable 114 is provided by the operator, controller 10 and locking mechanism 112 prevent unauthorized removal of cable 114 from charging station 100 during charging.

As described with respect to charging station 12, charging station 100 may also include authorization device 78. Furthermore, controller 10 includes a plurality of state machines. Controller 10 operates in accordance with a selected one of the plurality of state machines. For example, controller 10 may include a state machine configured such that controller 10 operates in accordance with the requirements of the second location, for example, in accordance with IEC standards. For example, controller 10 is configured to receive inputs from devices including, but not limited to, RCD 110 and locking mechanism 112, and operate charging station 100 in accordance with IEC standards.

Figure 3:
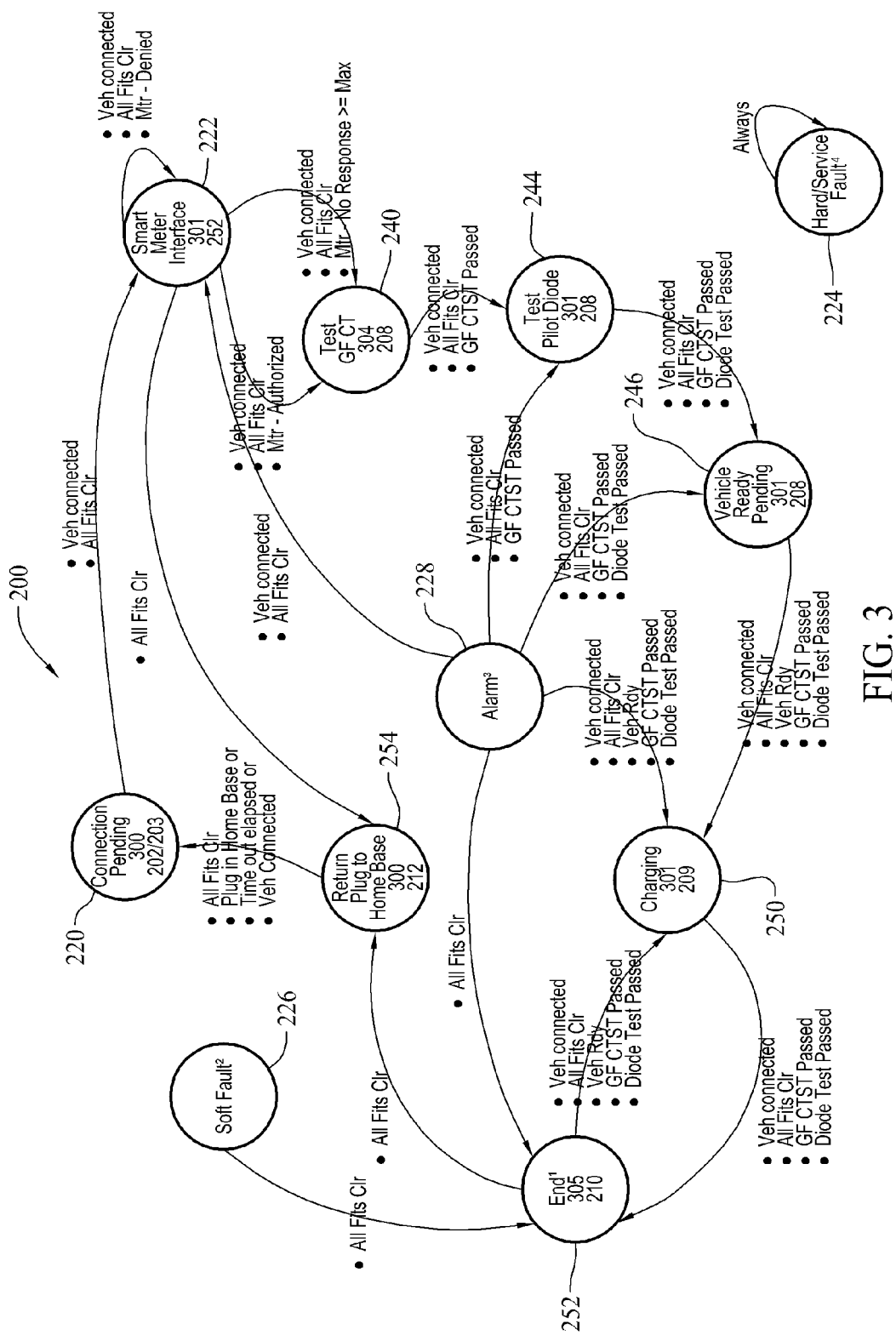
FIG. 3 is an exemplary embodiment of a first state machine stored within the charging station controller shown in FIG. 1.

FIG. 3 is an exemplary embodiment of a first state machine 200 stored within controller 10 (shown in FIG. 1). In the exemplary embodiment, first state machine 200 corresponds to NEMA compliant operation of controller 10. More specifically, controller 10, when instructed to operate in accordance with first state machine 200, will control operation of charging station 12 (shown in FIG. 1) in compliance with NEMA standards.

In the exemplary embodiment, when charging station 12 is idle, state machine 200 is in a connection pending state 220 waiting for a user to connect a vehicle, for example, vehicle 22 (shown in FIG. 1), to charging station 12. From connection pending state 220, state machine 200 may transition to a smart meter interface state 222, a hard/service fault state 224, a soft fault state 226, or an alarm state 228. When vehicle 22 is connected to charging station 12 and no faults/alarms are detected, state machine 200 transitions from connection pending state 220 to smart meter interface state 222. Exit criteria for exiting connection pending state 220 may include, but is not limited to, a determination that vehicle 22 is coupled to charging station 12 and that no faults are detected. Once entering a new state, state machine 200 runs all associated entry and waiting actions for that state while waiting for the exit criteria to be satisfied.

For example, entry actions for smart meter interface state 222 may include, but are not limited to, driving LED bar 74 (shown in FIGS. 1) to indicate that vehicle 22 is connected, requesting authorization from a smart meter, for example, smart meter 82 (shown in FIG. 1), and passively updating user display 76 (shown in FIG. 1) based on the current state. Examples of wait actions for smart meter interface state 222 include, but are not limited to, waiting for smart meter authorization and timing out if no response is received from smart meter 82. When vehicle 22 is connected to charging station 12, no faults/alarms are detected in the system, and after receipt of authorization from smart meter 82, or after timing out if no response is received, state machine 200 transitions into a ground fault test state 240. State machine 200 transitions out of ground fault test state 240 and into a pilot test state 244 when vehicle 22 is connected to charging station 12, no faults/alarms are detected in the system, and a ground fault test is passed. For example, controller 10 bases the ground fault test on a signal received from ground fault testing device 66 (shown in FIG. 1).

State machine 200 transitions out of pilot test state 244 and into a vehicle ready pending approval state 246 when vehicle 22 is connected to charging station 12, no faults/alarms are detected, the ground fault test is passed, and the pilot test is passed. State machine 200 transitions out of vehicle ready pending approval state 246 and into a charging state 250 when vehicle 22 is connected to charging station 12, no faults/alarms are detected, the ground fault test is passed, the pilot test is passed, and a charge signal is received, for example, from the operator of vehicle 22 and/or from system controller 94 via the pilot signal. When vehicle 22 discontinues sending the charge signal, state machine 200 transitions to an end state 252. Not receiving the charge signal from vehicle 22 indicates to charging station 12 that vehicle 22 is not requesting power from charging station 12. State machine 200 may transition back to charging state 250 if the charge signal is received at controller 10 while in end state 252.

State machine 200 also transitions out of end state 252 to a return connector state 254 when no faults/alarms are detected and output connector 62 (shown in FIG. 1) is removed from vehicle 22. Moreover, state machine 200 transitions out of return connector state 254 to connection pending state 220 when no faults/alarms are detected and either connector 62 is returned to charging station 12 or connector 62 is not returned to charging station 12 and a predefined time limit is exceeded.

State machine 200 may enter hard/service fault state 224, soft fault state 226, and alarm state 228 from any other state. To exit a state, controller 10 checks if any faults/alarms are detected in the system. For example, all states (other than connection pending state 220 and hard/service fault state 224) exit to end state 252 when vehicle 22 is disconnected. Similarly, state machine 200 transitions from any state to hard/service fault state 224 when controller 10 detects a hard/service fault. State machine 200 transitions from any state (other than hard/service fault state 224) to soft fault state 226 when controller 10 detects a soft fault. State machine 200 transitions from any state (other than hard/service fault state 224 and soft fault state 226) to alarm state 228 when controller 10 detects an alarm. State machine 200 will exit soft fault state 226 when connector 62 is disconnected from vehicle 22. Once connector 62 is disconnected from vehicle 22, state machine 200 will transition from soft fault state 226 to end state 252. In contrast, state machine 200 will exit hard/service fault state 224 only when charging station 12 is disconnected from power source 52 (shown in FIG. 1), charging station 12 is serviced, and power is returned to charging station 12.

Examples of hard/service faults include, but are not limited to, a pilot signal outside of a predefined range at power up, improper control configuration, a contactor that is welded closed, a corrupt non-volatile memory, a measured temperature outside of a predefined range, a controller error, and an invalid media access control (MAC) address.

Examples of soft faults include, but are not limited to, a ground fault sensor self-test failure, an over current trip, a pilot diode self-test failure, a contactor not closing, and receipt of a request for vent fan charging when the charging station is not configured to support such charging.

Examples of alarms include, but are not limited to, a detected ground fault, an engaged E-Stop, a pilot signal that violates an expected transition, a grounded pilot signal, a detected over voltage, a detected under voltage, and a signal from a smart meter that disables charging.

Figure 4:
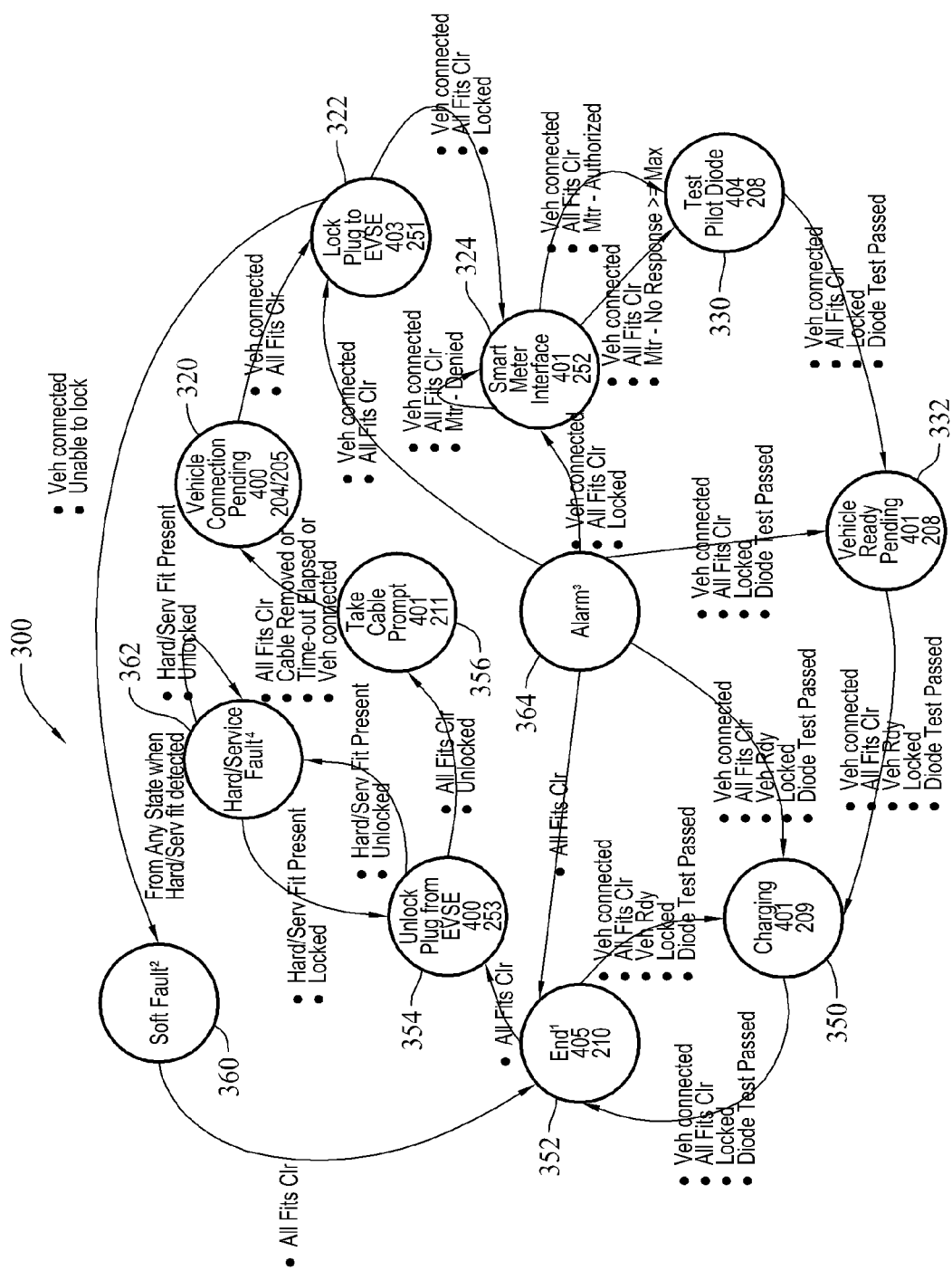
FIG. 4 is an exemplary embodiment of a second state machine stored within the charging station controller shown in FIG. 1.

FIG. 4 is an exemplary embodiment of a second state machine 300 stored within controller 10 (shown in FIG. 2). In the exemplary embodiment, second state machine 300 corresponds to IEC compliant operation of controller 10. More specifically, controller 10, when instructed to operate in accordance with second state machine 300, will control operation of charging station 100 (shown in FIG. 2) in compliance with IEC standards.

In the exemplary embodiment, when charging station 100 is idle, state machine 300 is in a connection pending state 320 waiting for a user to connect a vehicle, for example, vehicle 22 (shown in FIG. 1), to charging station 100. From connection pending state 320, state machine 300 transitions to a plug lock state 322 when vehicle 22 is connected to charging station 100 and no faults/alarms are detected. As described above, charging station 100 includes a locking mechanism 112 for locking cable 114 to charging station 100. State machine 300 transitions from plug lock state 322 to a smart meter interface state 324 when vehicle 22 is connected to charging station 100, no faults/alarms are detected, and locking mechanism 112 is activated to lock cable 114 to charging station 100.

Entry actions for smart meter interface state 324 may include, but are not limited to, driving LED bar 74 (shown in FIG. 2) to indicate that vehicle 22 is connected, requesting authorization from smart meter 82 before proceeding, and passively updating user display 76 (shown in FIG. 2) based on the current state. Examples of wait actions for smart meter interface state 324 include, but are not limited to, waiting for smart meter authorization and timing out if no response is received from smart meter 82.

When vehicle 22 is connected to charging station 100, no faults/alarms are detected, and after receipt of authorization from smart meter 82, or after timing out if no response is received from smart meter 82, state machine 300 transitions into a pilot test state 330. State machine 300 transitions out of pilot test state 330 and into a vehicle ready pending approval state 332 when vehicle 22 is connected to charging station 100, no faults/alarms are detected, locking mechanism 112 is activated to lock cable 114 to charging station 100, and the pilot test is passed. State machine 300 transitions out of vehicle ready pending approval state 332 and into a charging state 350 when vehicle 22 is connected to charging station 100, no faults/alarms are present in the system, locking mechanism 112 is activated to lock cable 114 to charging station 100, the pilot test is passed, and a charge signal is received, for example, from the operator of vehicle 22 and/or from system controller 94 via the pilot signal. When vehicle 22 discontinues sending the charge signal, state machine 300 transitions to an end state 352. Not receiving the charge signal from vehicle 22 indicates to charging station 100 that vehicle 22 is not requesting additional power from charging station 100. State machine 300 may transition back to charging state 350 if the charge signal is received at controller 10 while in end state 352.

State machine 300 also transitions out of end state 352 to a plug unlock state 354 when no faults/alarms are detected. In plug unlock state 354, controller 10 unlocks output connector 62 from charging station 100. State machine 300 may transition from plug unlock state 354 to a user prompt state 356 where controller 10, via LED bar 74 (shown in FIG. 2), instructs the user to remove cable 114 from charging station 100. Moreover, state machine 300 transitions out of user prompt state 356 to connection pending state 320 when no faults/alarms are detected and either cable 114 is disconnected from charging station 100 or if cable 114 is not removed from charging station 100 and a predefined time limit is exceeded.

State machine 300 also includes a soft fault state 360, a hard/service fault state 362, and an alarm state 364. State machine 300 may enter soft fault state 360, hard/service fault state 362, and alarm state 364 from any other state. To exit a state, controller 10 checks if any faults/alarms are present in the system. For example, all states (other than connection pending state 320 and hard/service fault state 362) exit to the end state 352 when vehicle 22 is disconnected from charging station 100. Similarly, state machine 300 transitions from any state to hard/service fault state 362 when controller 10 detects a hard/service fault. State machine 300 transitions from any state (other than hard/service fault state 362) to soft fault state 360 when controller 10 detects a soft fault. State machine 300 transitions from any state (other than hard/service fault state 362 and soft fault state 360) to alarm state 364 when controller 10 detects an alarm. State machine 300 will exit soft fault state 360 when connector 62 is disconnected from vehicle 22. Once disconnected, state machine 300 will transition from soft fault state 360 to end state 352. In contrast, state machine 300 will exit hard/service fault state 362 only when charging station 100 is disconnected from power source 52 (shown in FIG. 1), charging station 100 is serviced, and power is returned to charging station 100. Furthermore, to facilitate allowing a user to remove cable 114 from charging station 100, after occurrence of a hard/service fault, state machine transitions from hard/service fault state 362 to plug unlock state 354. Once cable 114 is removed from charging station 100, state machine 300 returns to hard/service fault state 362 until power is removed from charging station 100, charging station 100 is serviced, and power to charging station 100 is restored.

In contrast to state machine 200, state machine 300 does not include a ground fault testing state. Rather, and due to the hardware differences between NEMA charging station 12 and IEC charging station 100, if controller 10 determines the residual current is above the predefined level, based on a signal from RCD 110 (shown in FIG. 2), state machine 300 enters soft fault state 360.

Figure 5:
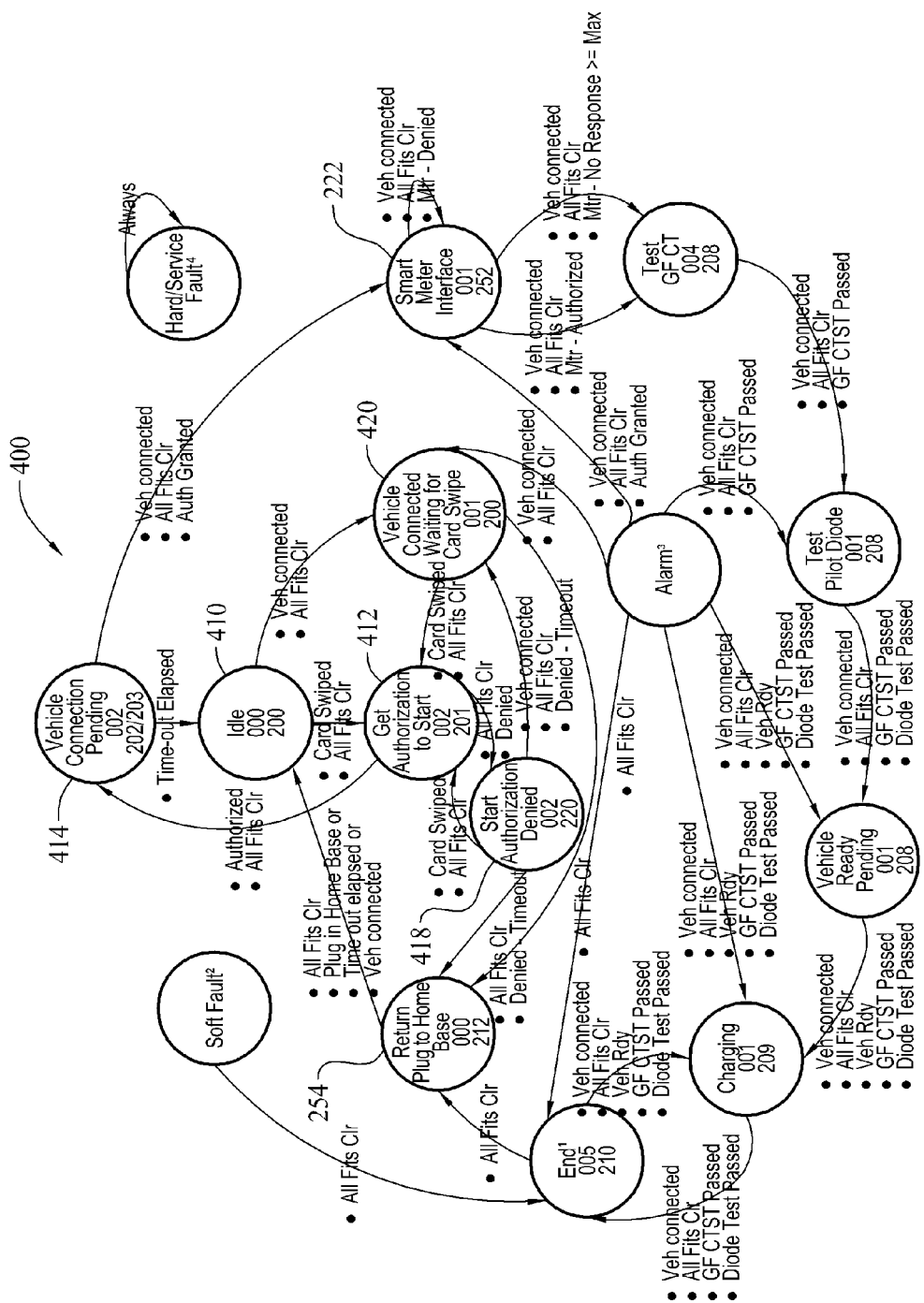
FIG. 5 is an exemplary embodiment of a third state machine stored within the charging station controller shown in FIG. 1.

FIG. 5 is an exemplary embodiment of a third state machine 400 stored within controller 10 (shown in FIG. 1). In the exemplary embodiment, third state machine 400 corresponds to NEMA compliant operation of controller 10 in a charging station that includes an authorization device, for example, authorization device 78 (shown in FIG. 1). More specifically, controller 10, when instructed to operate in accordance with third state machine 400, will control operation of charging station 12 (shown in FIG. 1) in compliance with NEMA standards and only provide power to vehicle 22 after receiving proper authorization.

State machine 400 includes an idle state 410 where controller 10 waits to receive an authorization input from a user. State machine 400 transitions from idle state 410 to an authorization state 412 when controller 10 receives an authorization input from a user, for example, via authorization device 78. If the authorization is approved, state machine 400 transitions to a vehicle connection pending state 414. State machine 400 transitions from vehicle connection pending state 414 to a smart meter interface state 222 when vehicle 22 is connected to charging station 12, no faults/alarms are detected, and authorization is approved.

If the authorization is denied, state machine 400 enters an authorization denied state 418. If the authorization input is received again, state machine 400 returns to authorization state 412 to determine if the authentication is approved. If the authorization input is not received again, state machine transitions to return connector state 254 after a predefined time limit is exceeded.

Alternatively, if output connector 62 is connected to vehicle 22 when state machine 400 is in idle state 410, state machine 400 enters vehicle connected/waiting for authorization input state 420. If authorization is approved and no faults/alarms are detected, state machine 400 transitions to smart meter interface state 222.

Figure 6:
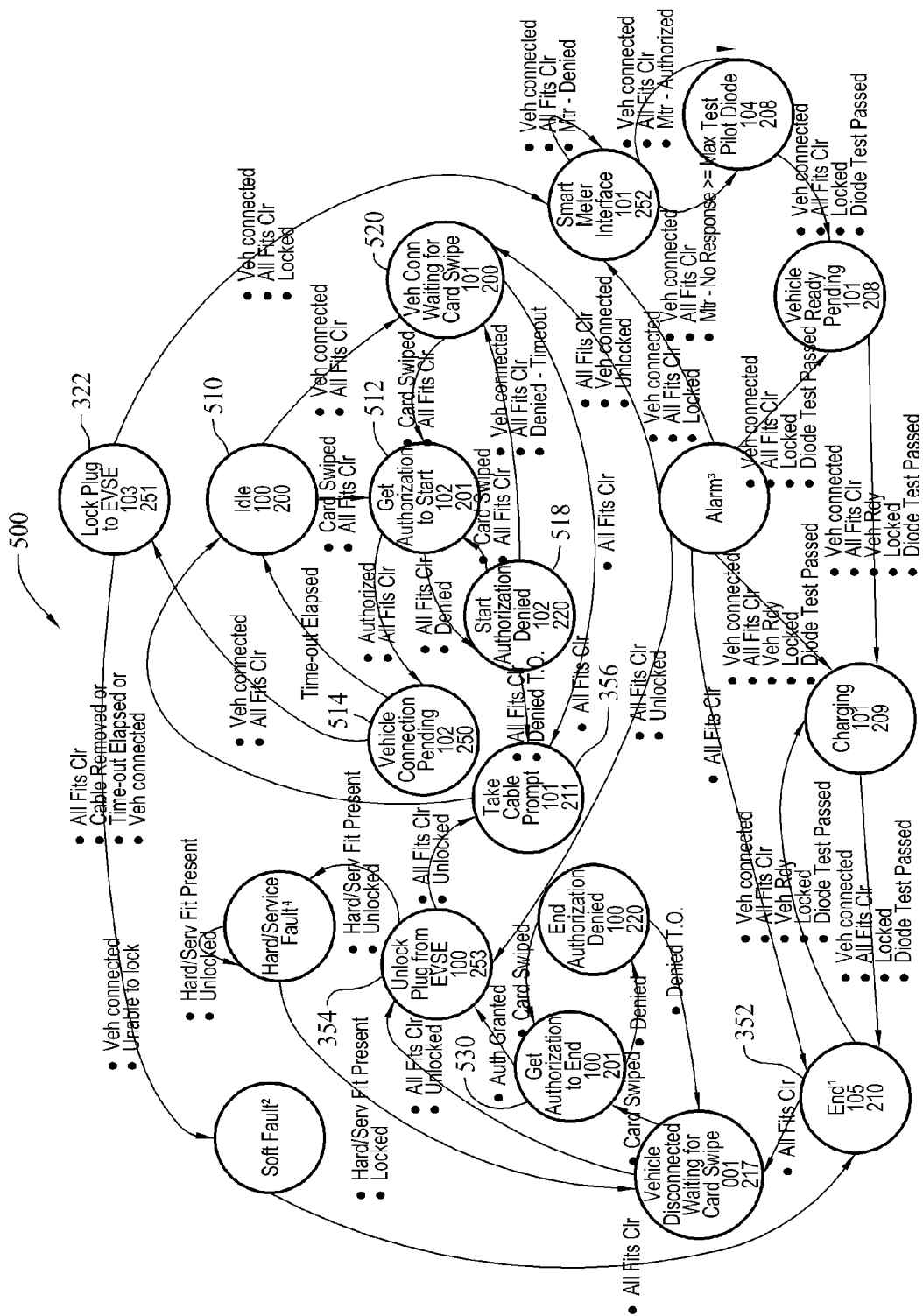
FIG. 6 is an exemplary embodiment of a fourth state machine stored within the charging station controller shown in FIG. 1.

FIG. 6 is an exemplary embodiment of a fourth state machine 500 stored within controller 10 (shown in FIG. 1). In the exemplary embodiment, fourth state machine 500 corresponds to IEC compliant operation of controller 10 in a charging station that includes an authorization device, for example, authorization device 78 (shown in FIG. 2). More specifically, controller 10, when instructed to operate in accordance with fourth state machine 500, will control operation of charging station 100 (shown in FIG. 2) in compliance with IEC standards and only provide power to vehicle 22 after receiving proper authorization.

State machine 500 includes authorization states both for receiving permission to charge a vehicle using charging station 100 and for receiving permission to unlock cable 114 from charging station 100. For example, state machine 500 includes an idle state 510 where controller 10 waits to receive an authorization input from a user. State machine 500 transitions from idle state 510 to an authorization state 512 when controller 10 receives an authorization input from a user, for example, via authorization device 78. If the authorization is approved, state machine 500 transitions to a vehicle connection pending state 514. State machine 500 transitions from vehicle connection pending state 514 to plug lock state 322 when vehicle 22 is connected to charging station 100, no faults/alarms are detected, and authorization is approved.

If the authorization is denied, state machine 500 enters an authorization denied state 518. If the authorization input is received again, state machine 500 returns to authorization state 512 to determine if the authentication is approved. If the authorization input is not received again, state machine transitions to remove user prompt state 356 after a predefined time limit is exceeded.

Alternatively, if vehicle 22 is coupled to charging station 100 when state machine 500 is in idle state 510, state machine 500 enters vehicle connected/waiting for authorization input state 520. If authorization is approved and no faults/alarms are detected, state machine 500 transitions to plug lock state 322.

To ensure that only an authorized user uncouples cable 114 from charging station 100, state machine 500 may transition from end state 352 to an authorization state 530. Controller 10 receives an authorization input via authorization device 78, and if approved, transitions from authorization state 530 to unlock plug state 354. If the authorization input is denied, state machine 500 transitions back to authorization state 530.

Figure 7:
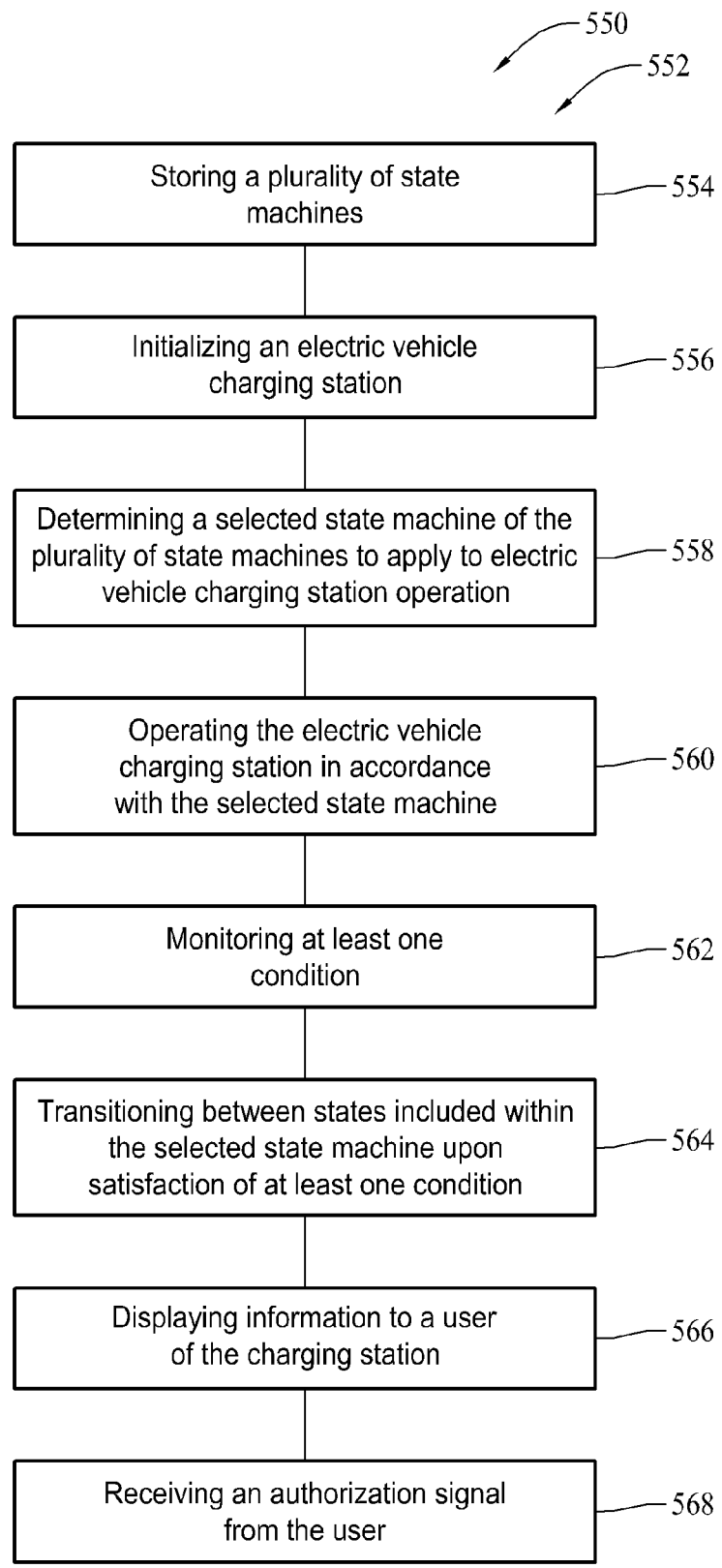
FIG. 7 is a flow chart of an exemplary method for controlling an electric vehicle charging station.

FIG. 7 is a flow chart 550 of an exemplary method 552 for controlling an electric vehicle charging station, for example, electric vehicle charging station 12 (shown in FIG. 1) and/or electric vehicle charging station 100 (shown in FIG. 2). In the exemplary embodiment, method 552 includes storing 554 a plurality of state machines, for example, first state machine 200 (shown in FIG. 3), second state machine 300 (shown in FIG. 4), third state machine 400 (shown in FIG. 5), and fourth state machine 500 (shown in FIG. 6). In the exemplary embodiment, the state machines are stored as firmware within a controller, for example, controller 10 (shown in FIGS. 1 and 2). In the exemplary embodiment, method 552 also includes initializing 556 electric vehicle charging station 12 and determining 558 a selected state machine of the plurality of state machines to apply to electric vehicle charging station operation. Furthermore, method 552 includes operating 560 electric vehicle charging station 12 in accordance with the selected state machine. More specifically, operating 560 includes configuring a charging station controller, for example, controller 10 (shown in FIG. 1), to operate charging station 12 in accordance with a state machine associated with a charging station selection signal.

Controller 10 may determine 558 which of the state machines to apply based on a charging station selection signal associated with one state machine of the plurality of state machines. The charging station selection signal may be received from a user, for example, at input interface 80 (shown in FIG. 1).

Alternatively, controller 10 may determine 558 which of the state machines to apply by analyzing devices coupled to the electric vehicle charging station controller and/or analyzing a configuration of charging station controller 10. For example, controller 10 may determine that an RCD, for example, RCD 110 (shown in FIG. 2), is coupled to controller 10. Based on this information, controller 10 may determine that a state machine conforming with IEC specifications should be applied. Alternatively, controller 10 may determine that a ground fault testing device, for example, ground fault testing device 66 (shown in FIG. 1) is coupled to controller 10. Based on this information, controller 10 may determine that a state machine conforming with NEMA specifications should be applied.

In the exemplary embodiment, method 552 also includes monitoring 562 at least one condition and transitioning 564 between states included within the selected state machine upon satisfaction of the at least one condition. For a NEMA compliant state machine, for example, state machines 200 and 400, monitoring 562 may include, but is not limited to, testing for a ground fault condition, monitoring a connection between charging station 12 and electric vehicle 22, receiving a charge signal from the user, and monitoring a charge level of electric vehicle 22.

In another example, for an IEC compliant state machine, for example, state machines 300 and 500, monitoring 562 may include, but is not limited to, monitoring a test pilot diode in electric vehicle 22, monitoring a charge level of electric vehicle 22, monitoring fault/alarm conditions, and monitoring a locking mechanism that secures a cable to charging station 100.

Method 552 may also include displaying 566 information to a user of charging station 12, wherein the information is dependent upon a current state. For example, a display device, for example, at least one display device 72 (shown in FIG. 1), is configured to display information to a user of charging station 12. Furthermore, method 552 may include receiving 568 an authorization signal and authenticating the identity of the user. For example, a user may provide information to controller 10 using an authorization device, for example, authorization device 78 (shown in FIG. 1). As an additional example of determining 558 which state machine to run, controller 10 may determine that authorization device 78 is coupled to controller 10. Based on this information, controller 10 may determine that a state machine that includes at least one authorization state, for example, state machines 400 and 500, should be applied.

Described herein are exemplary methods and systems for charging of a vehicle that includes an electrochemical energy storage device. The methods and systems facilitate use of a single electric vehicle charging station controller in various models of electric vehicle charging station. Such models may be required to adhere to local standards and/or protocols. The charging station controller is configured to operate in accordance with a plurality of state machines, wherein each state machine corresponds to a different model of electric vehicle charging station.

The methods and systems described herein facilitate efficient and economical charging of an electric vehicle. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a charging device for charging an energy storage device of an electric vehicle, said method comprising:
   storing a plurality of state machines, each state machine including a plurality of states, wherein for each state machine of the plurality of state machines, each state of the plurality of states is configured to manage a different action included in a charging cycle for the electric vehicle; and
   configuring a charging device controller to select only one state machine of the plurality of state machines at a time and to operate the charging device in accordance with the selected state machine to the exclusion of unselected state machines of the plurality of state machines.

2. A method in accordance with claim 1, further comprising configuring the charging device controller to determine which of the plurality of state machines to select.

3. A method in accordance with claim 2, wherein configuring the charging device controller to determine which of the plurality of state machines to select comprises configuring an input interface to receive a charging device selection signal associated with one state machine of the plurality of state machines.

4. A method in accordance with claim 2, wherein configuring the charging device controller to determine which of the plurality of state machines to select comprises analyzing a configuration of the charging device controller.

5. A method in accordance with claim 1, further comprising configuring a display device to display information to a user of the charging device.

6. A method in accordance with claim 1, further comprising configuring an authorization device coupled to the charging device controller to receive an authorization signal from a user.

7. A method in accordance with claim 1, wherein storing a plurality of state machines comprises, storing a state machine configured to test for a ground fault condition, monitor a connection between the charging device and the electric vehicle, and discontinue charging of the electric vehicle upon occurrence of a fault.

8. A method in accordance with claim 1, wherein storing a plurality of state machines comprises, storing a state machine configured to lock a connection device to the charging device, monitor a pilot diode in the electric vehicle, discontinue charging of the electric vehicle upon occurrence of a fault, and unlock the connection device from the charging device.

9. A method in accordance with claim 1, wherein a state of the plurality of states includes at least one of a connection pending state, a smart meter interface state, a hard fault state, a soft fault state, an alarm state, a ground fault test state, a pilot test state, a pending approval state, a charging state, a lock connector state, an unlock connector state, a return connector state, and an authorization state.

10. A method for charging an energy storage device of an electric vehicle, said method comprising:
    storing a plurality of state machines, each state machine including a plurality of states, wherein for each state machine of the plurality of state machines, each state of the plurality of states is configured to manage a different action included in a charging cycle for the electric vehicle;
    configuring a charging device controller to select only one state machine of the plurality of state machines at a time; and
    configuring a charging device controller to charge the energy storage device in accordance with the selected state machine to the exclusion of unselected state machines of the plurality of state machines.

11. A method in accordance with claim 10, wherein each state machine is configured to provide entry actions and exit actions associated with each state.

12. A method in accordance with claim 10, wherein each state machine is configured to provide waiting actions that are executed while waiting to transition out of the state.

13. A method in accordance with claim 10, wherein said charging device includes an input interface configured to receive a state machine selection signal.

14. A method in accordance with claim 10, wherein the predetermined state machine is configured to be selected by a technician upon installation of the charging device.

15. A method in accordance with claim 10, wherein the predetermined state machine is configured to be selected by a configuration server coupled to the charging device.

16. A method in accordance with claim 10, further comprising updating the stored plurality of state machines to configure at least one state machine of the plurality of state machines with new or edited states.

17. A method in accordance with claim 11, wherein said entry actions comprise requesting authorization from a smart meter connected to the charging device.

18. A method in accordance with claim 11, wherein said entry actions comprise updating a user display based on a current state.

19. A method in accordance with claim 12, wherein said waiting actions comprise waiting for a smart meter connected to the charging device to provide an authorization to proceed with charging.

\* \* \* \* \*

UNITED STATES PATENT AND TRADEMARK OFFICE
CERTIFICATE OF CORRECTION

| | |
|---|---|
| PATENT NO. | : 9,054,535 B2 |
| APPLICATION NO. | : 13/589843 |
| DATED | : June 9, 2015 |
| INVENTOR(S) | : Thomas et al. |

Page 1 of 1

It is certified that error appears in the above-identified patent and that said Letters Patent is hereby corrected as shown below:

Specification

In Column 1, Line 9, delete "by" and insert -- by reference --, therefor.

Signed and Sealed this
Tenth Day of November, 2015

Michelle K. Lee
*Director of the United States Patent and Trademark Office*